(12) United States Patent
Shi et al.

(10) Patent No.: US 10,609,433 B2
(45) Date of Patent: Mar. 31, 2020

(54) RECOMMENDATION INFORMATION PUSHING METHOD, SERVER, AND STORAGE MEDIUM

(71) Applicant: TENCENT TECHNOLOGY (SHENZHEN) COMPANY LIMITED, Shenzhen (CN)

(72) Inventors: Chuan Shi, Shenzhen (CN); Peng He, Shenzhen (CN); Lingling Yi, Shenzhen (CN); Zhiqiang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 95 days.

(21) Appl. No.: 15/715,840

(22) Filed: Sep. 26, 2017

(65) Prior Publication Data

US 2018/0020250 A1 Jan. 18, 2018

Related U.S. Application Data

(63) Continuation of application No. PCT/CN2016/084284, filed on Jun. 1, 2016.

(30) Foreign Application Priority Data

Sep. 8, 2015 (CN) .......................... 2015 1 0567428

(51) Int. Cl.
*H04N 21/25* (2011.01)
*G06F 16/9535* (2019.01)
(Continued)

(52) U.S. Cl.
CPC .......... *H04N 21/251* (2013.01); *G06F 16/00* (2019.01); *G06F 16/9535* (2019.01);
(Continued)

(58) Field of Classification Search
None
See application file for complete search history.

(56) References Cited

U.S. PATENT DOCUMENTS 6,020,883 A * 2/2000 Herz .................... G06Q 20/383
348/E7.056
9,686,577 B2 * 6/2017 Tseng ............... H04N 21/26291
(Continued)

FOREIGN PATENT DOCUMENTS

CN 103336793 A 10/2013
CN 103955535 A 7/2014
(Continued)

OTHER PUBLICATIONS

The World Intellectual Property Organization (WIPO) International Search Report for PCT/CN2016/084284 dated Sep. 7, 2016 6 Pages (including translation).
(Continued)

*Primary Examiner* — Jason K Lin
(74) *Attorney, Agent, or Firm* — Anova Law Group, PLLC

(57) ABSTRACT

A method for pushing recommendation information is provided, and the method includes: obtaining a meta path that connects a candidate user and a target user in a heterogeneous information network, the meta path comprising a connection between the candidate user and a candidate recommendation-object and having an attribute value; obtaining a user similarity between the target user and the candidate user relative to the meta path; estimating an attribute value of a connection between the candidate recommendation-object and the target user according to the attribute value of the connection between the candidate user and the candidate recommendation-object, an attribute value constraint condition of the meta path, and the user similarity; and sending recommendation information of the candidate
(Continued)

recommendation-object to a terminal corresponding to the target user when the estimated attribute value meets a recommendation condition.

17 Claims, 6 Drawing Sheets

(51) Int. Cl.
G06F 16/00 (2019.01)
G06Q 30/02 (2012.01)
H04N 21/258 (2011.01)
G06Q 30/06 (2012.01)

(52) U.S. Cl.
CPC ....... G06Q 30/0255 (2013.01); H04N 21/252 (2013.01); H04N 21/25891 (2013.01); *G06Q 30/0631* (2013.01)

(56) References Cited

U.S. PATENT DOCUMENTS

| | | | | |
|---|---|---|---|---|
| 2007/0118546 | A1* | 5/2007 | Acharya | G06F 16/9535 |
| 2008/0288596 | A1* | 11/2008 | Smith | G06Q 30/02 |
| | | | | 709/206 |
| 2012/0084655 | A1* | 4/2012 | Gallagher | G11B 27/034 |
| | | | | 715/725 |
| 2012/0324491 | A1* | 12/2012 | Bathiche | H04H 60/33 |
| | | | | 725/10 |
| 2014/0289334 | A1* | 9/2014 | Wang | H04L 65/4069 |
| | | | | 709/204 |
| 2015/0019640 | A1* | 1/2015 | Li | G06F 3/00 |
| | | | | 709/204 |
| 2015/0039609 | A1* | 2/2015 | Weinstein | G06F 15/17306 |
| | | | | 707/734 |
| 2015/0149205 | A1 | 5/2015 | Lee et al. | |
| 2016/0350834 | A1* | 12/2016 | Wilson | G06Q 30/0631 |

FOREIGN PATENT DOCUMENTS

| | | |
|---|---|---|
| CN | 104077351 A | 10/2014 |
| CN | 104239496 A | 12/2014 |
| CN | 104850632 A | 8/2015 |

OTHER PUBLICATIONS

The State Intellectual Property Office of the People's Republic of China (SIPO) Office Action 1 for 201510567428.9 dated Jan. 15, 2020 9 pages (including translation).

Run-Tao Lv et al., "Friend Recommendation Model with Multidimensional Features in Heterogeneous Social Network", Laser Journal, vol. 35. No. 12. 2014. Dec. 31, 2014 (Dec. 31, 2014), pp. 108-111. Total 5 pages.

* cited by examiner

RECOMMENDATION INFORMATION PUSHING METHOD, SERVER, AND STORAGE MEDIUM

RELATED APPLICATION

This application is a continuation application of PCT Patent Application No. PCT/CN2016/084284, filed on Jun. 1, 2016, which claims priority to Chinese Patent Application No. 201510567428.9, entitled "METHOD AND APPARATUS FOR PUSHING RECOMMENDATION INFORMATION" filed on Sep. 8, 2015, which is incorporated by reference in its entirety.

FIELD OF THE TECHNOLOGY

The present disclosure relates to the field of information processing technologies, and in particular, to a method for pushing recommendation information, a server, and a storage medium.

BACKGROUND OF THE DISCLOSURE

By recommending users with candidate objects such as movies, music, books, friends, groups, or goods, the users can obtain information about the corresponding recommended candidate objects without the need of active search, providing the users with a way to passively obtain information. Currently, one kind of method for pushing recommendation information is mainly implemented based on a social-network relationship between users. For example, if a user A watches a movie M, and the user A and a user B are in a friend relationship, the user A may recommend the movie M to the user B.

However, for the current recommendation information method, only the social-network relationship between the users is considered. But the users having the social-network relationship do not necessarily have same recommendation need. For example, a user A and a user B are in a friend relationship, but the user A and the user B may have totally different movie preferences. As a result, recommending a movie M watched by the user A to the user B is inaccurate. As can be seen, for current method for pushing recommendation information based on the social-network relationship, the recommendation result often is inaccurate, and such method may need to be improved.

SUMMARY

Embodiments of the present invention provide a method for pushing recommendation information, a server, and a non-transitory computer-readable storage medium.

The method for pushing recommended information includes: obtaining a meta path that connects a candidate user and a target user in a heterogeneous information network, the meta path comprising a connection between the candidate user and a candidate recommendation-object and having an attribute value; obtaining a user similarity between the target user and the candidate user relative to the meta path; estimating an attribute value of a connection between the candidate recommendation-object and the target user according to the attribute value of the connection between the candidate user and the candidate recommendation-object, an attribute value constraint condition of the meta path, and the user similarity; and sending recommendation information of the candidate recommendation-object to a terminal corresponding to the target user when the estimated attribute value meets a recommendation condition.

The server includes a memory storing instructions, and a processor coupled to the memory. The processor executes the instructions and is configured for: obtaining a meta path that connects a candidate user and a target user in a heterogeneous information network, the meta path comprising a connection between the candidate user and a candidate recommendation-object and having an attribute value; obtaining a user similarity between the target user and the candidate user relative to the meta path; estimating an attribute value of a connection between the candidate recommendation-object and the target user according to the attribute value of the connection between the candidate user and the candidate recommendation-object, an attribute value constraint condition of the meta path, and the user similarity; and sending recommendation information of the candidate recommendation-object to a terminal corresponding to the target user when the estimated attribute value meets a recommendation condition.

The non-transitory computer-readable storage medium containing computer-executable instructions for, when executed by one or more processors, performing a recommendation information pushing method. The method includes: obtaining a meta path that connects a candidate user and a target user in a heterogeneous information network, the meta path comprising a connection between the candidate user and a candidate recommendation-object and having an attribute value; obtaining a user similarity between the target user and the candidate user relative to the meta path; estimating an attribute value of a connection between the candidate recommendation-object and the target user according to the attribute value of the connection between the candidate user and the candidate recommendation-object, an attribute value constraint condition of the meta path, and the user similarity; and sending recommendation information of the candidate recommendation-object to a terminal corresponding to the target user when the estimated attribute value meets a recommendation condition.

Details of one or more embodiments of the present invention are provided in the following accompanying drawings and descriptions. Other features, objectives, and advantages of the present disclosure become more obvious from the specification, accompanying drawings, and claims.

DESCRIPTION OF EMBODIMENTS

To make the objectives, technical solutions, and advantages of the present disclosure clearer, the following further describes the present disclosure in detail with reference to the accompanying drawings and embodiments. It should be understood that, specific embodiments described herein are only used for explaining the present disclosure, but not used for limiting the present disclosure.

For ease of understanding a method for pushing recommendation information provided in the present disclosure, related concepts of a heterogeneous information network are explained and described first.

Figure 1:
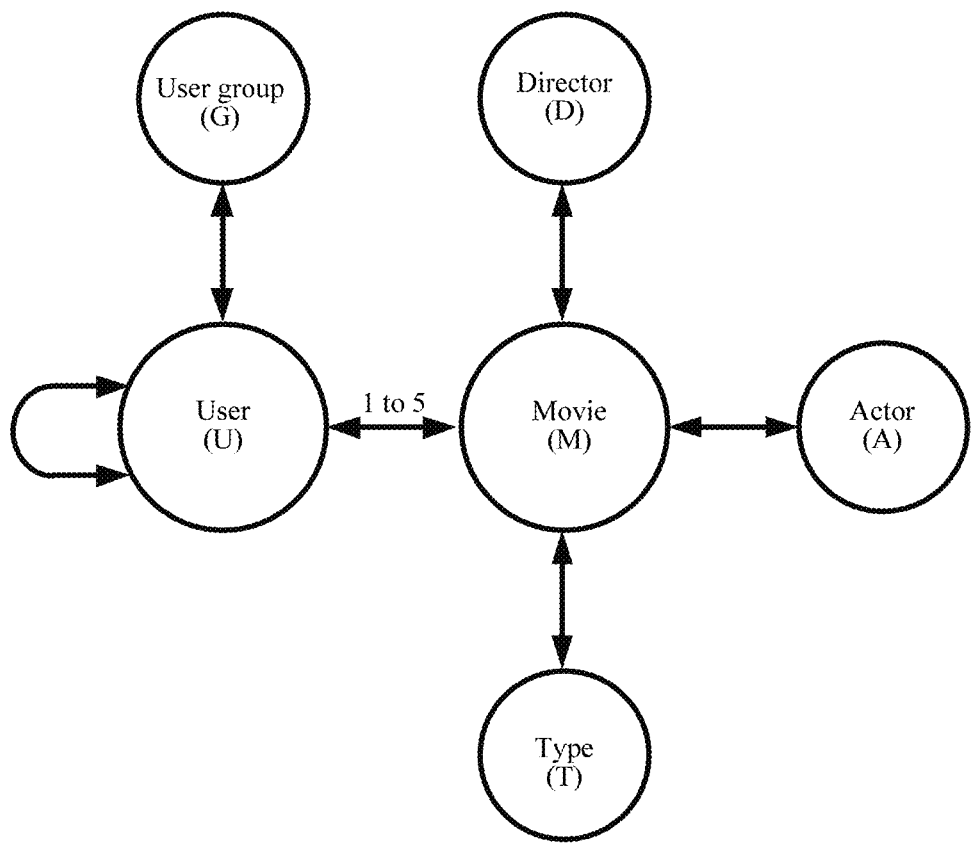
FIG. 1 is a schematic diagram of a network mode of a heterogeneous information network used for recommending movies in an embodiment.

Referring to FIG. 1, a bottom-layer data structure of the heterogeneous information network is a directed graph. The heterogeneous information network includes different types of objects and connections, and connections between objects represent different relationships. Heterogeneity and abundant information make the heterogeneous information network a better data expression form in many scenarios. A meta path is a unique feature in the heterogeneous information network, and it connects two objects in the network by using a relationship sequence between two object types, and is widely applied to explore abundant semantic information. The user, the user attribute, the candidate recommendation-object, and the attribute of the candidate recommendation-object may all be used as objects in the heterogeneous information network, and a connection represents a relationship between connected objects.

The heterogeneous information network may be used for recommending movies. In this case, the heterogeneous information network includes different types of objects, for example, users and movies; and further includes various relationships between these objects, such as movie watching information, social-network networks, and attribute information of objects. The heterogeneous information network can effectively integrate various types of information that may be useful to recommendation. In addition, exploring different semantics of objects and relationships in the network can disclose subtle relationships between the objects.

For example, a meta path "user-movie-user" in FIG. 1 represents users who have watched same movies, and the meta path may be used for retrieving similar users based on movie watching records. If movies are to be recommended according to the meta path, movies that have been watched by other users who have same movie watching records with target users are recommended. Similarly, users who have similar interests and hobbies can be found based on a meta path "user-interest group-user". Therefore, similar users can be found according to different meta paths of connected users, and recommendation-objects liked by the similar users are then directly recommended. Further, different recommendation models can be implemented by properly setting different meta paths.

Further, unlike a conventional heterogeneous information network and a conventional meta path, where an attribute value of a connection is not considered, the disclosed heterogeneous information network used for recommending movies may include a connection with an attribute value. Specifically, a user may give a rating value of 1 to 5 to a movie that the user has watched (as a connection between a user and a movie shown in FIG. 1), and a higher rating value indicates that the user likes the movie more. If the amplitude of the rating value is not considered, retrieval on similar users may lead to an inaccurate result.

For example, based on a path "user-movie-user", similarities of Tom and Mary or Bob are the same because they have watched same movies. However, they may give different rating values due to totally different interests. In fact, Tom and Bob give very high rating values to same movies. Therefore, they are similar based on the rating values. Mary has a totally different taste because she does not like these movies at all. The attribute value of the connection is not considered in the conventional meta path. Therefore, these differences cannot be disclosed. However, these differences are important, especially when a candidate recommendation-object is recommended. Therefore, concepts such as an existing heterogeneous information network and an existing meta path need to be improved to introduce the attribute value of the connections.

Specifically, a heterogeneous information network is defined. A network mode Sn=(A, R, W) is given and includes an object type set A={A}, a relationship set R={Re} of connected object pairs, and an attribute value set W={W} of relationships. An information network with an attribute value is a directed graph G=(V, E, W), and includes an object type mapping function φ:V→A, a connection type mapping function ψ:E→R, and an attribute value type mapping function θ:W→W. Each object v∈V belongs to a particular object type φ(e)∈A, each connection e∈E belongs to a particular relationship ψ(e)∈R and each attribute value w∈W belongs to a particular attribute value type θ(w)∈W. When the object type |A|=1 and the relationship type |R|=1, the network may be referred to as a homogeneous information network. When the object type |A|>1 (or the relationship type |R|>1) and the attribute value type |W|=0, the network may be referred to as a heterogeneous information network without an attribute value. When the object type |A|>1 (or the relationship type |R|>1) and the attribute value type |W|>0, the network may be referred to as a heterogeneous information network with an attribute value.

The conventional heterogeneous information network generally has no attribute value, that is, a relationship in the network has no attribute value or does not consider the attribute value. For the heterogeneous information network with an attribute value, some relationships in the network has attribute values, and these attribute values may be continuous or discrete. The continuous attribute values may be converted to discrete attribute values for processing. For example, in the heterogeneous information network used for recommending movies, the user may give a rating value of 1 to 5 to a movie that the user has watched. In a heterogeneous information network of scientific literature, a relationship between an author and a paper may have different attribute values to represent which author of the paper the author is.

Figure 2:
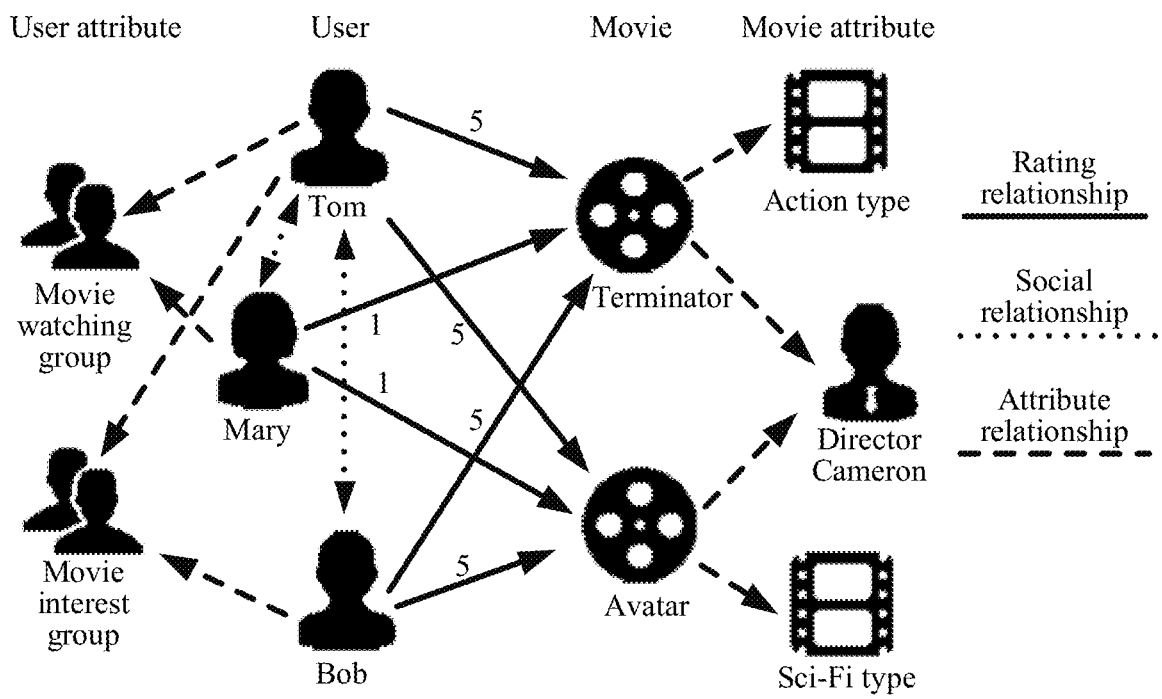
FIG. 2 is a schematic diagram of a heterogeneous information network that is used for recommending movies and that has an attribute value in an embodiment.

Referring to FIG. 2, a heterogeneous information network that is used for recommending movies and that has an attribute value is provided. FIG. 2 shows a network mode of the heterogeneous information network. The heterogeneous information network includes objects of six different object types (such as users, movies, interest groups, actors, directors, and movie types) and relationships between the objects, and connections between the objects represent different relationships. For example, a connection between users represents a social-network relationship, and a connection between users and movies represents a rating relationship. In addition, the rating relationship between users and movies further has an attribute value whose value range is an integer of 1 to 5.

Two objects in the heterogeneous information network may be connected through different meta paths, and these paths have different meanings. For example, in FIG. 2, users may be connected through paths such as "user-user (UU for short)", "user-group-user" (UGU for short), and "user-movie-user" (UMU for short). These meta paths are a relationship sequence between object types.

Next, a meta path in a heterogeneous network with an attribute value is defined. The meta path refers to a meta path whose connection has an attribute value constraint, and may be represented as $$A_1 \xrightarrow{\delta_1(Re_1)} A_2 \xrightarrow{\delta_2(Re_2)} \ldots \xrightarrow{\delta_l(Re_l)} A_{l+1} | C$$

(also may be written as $A_1(\delta_1(Re_1))A_2(\delta_2(Re_2)) \ldots (\delta_l(Re_l))A_{l+1}|C$ for short), where the subscript l represents a number of the meta path. If a connection of a relationship Re has an attribute value, an attribute value function $\delta(Re)$ is a set of attribute values in the relationship Re; otherwise, $\delta(Re)$ is an empty set.

$$A_l \xrightarrow{\delta_l(Re_l)} A_{l+1}$$

represents that the relationship $Re_l$ between $A_l$ and $A_{l+1}$ is based on the attribute value $\delta_l(Re_l)$ An attribute value constraint condition $C\lambda$ of the attribute value function is an associated constraint set between attribute value functions. If all attribute value functions of the meta path are empty sets (corresponding attribute value constraint conditions $C\lambda$ are also empty sets), the meta path is referred to as a meta path without an attribute value; otherwise, the meta path is referred to as a meta path with an attribute value or an extended meta path.

Using FIG. 2 as an example, a rating value of a rating relationship between a user U and a movie M may be 1 to 5. A meta path $$U \xrightarrow{1} M$$

(that is, U(1)M) represents that users rate 1 point for the movie, and means that the users do not like the movie. A meta path $$U \xrightarrow{1,2} M \xrightarrow{1,2} U$$

(that is, U(1,2)M(1,2)U) represents candidate users who do not like the same movie as the target user, and the meta path UMU without an attribute value may only reflect users who have same movie watching records. In addition, attribute values of different relationships in the meta path can be limited by flexibly setting associated constraints. Referring to FIG. 1, for example, the meta path U(i)M(j)U|i=j represents users who have totally same rating values on the same movies as the target user. In the meta path, it may be easily found that Tom and Bob are similar, but they are not similar with Mary.

Figure 3:
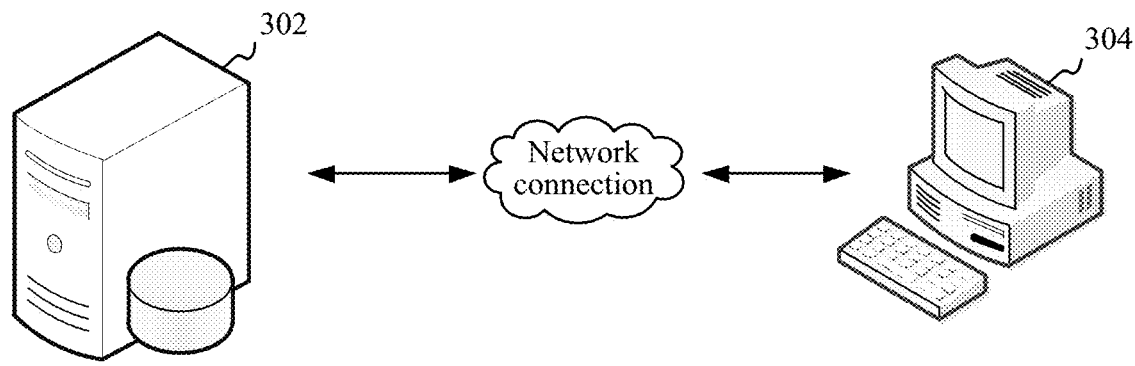
FIG. 3 is a diagram of an application environment of a recommendation system in an embodiment.

As shown in FIG. 3, in an embodiment, a recommendation system is provided and includes a server 302 and a terminal 304 connected through a network. The server 302 may be an independent physical server, or may be a server cluster formed by multiple physical servers. The terminal 304 may be a desktop computer or a mobile terminal, and the mobile terminal includes at least one of a mobile phone, a smart watch, a tablet computer, and a personal digital assistant (PDA).

Figure 4:
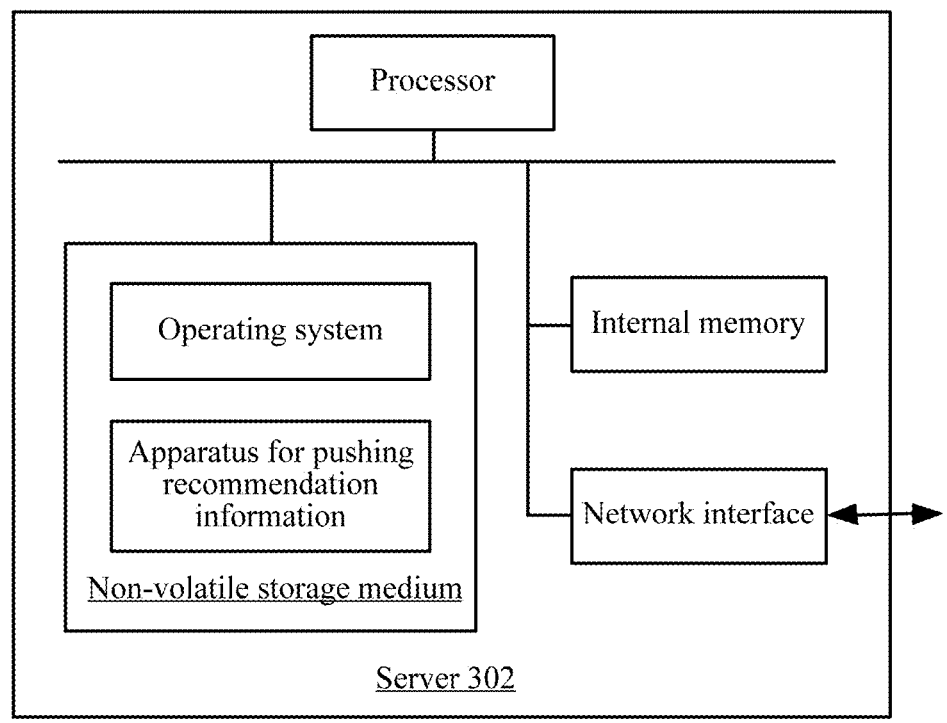
FIG. 4 is a schematic structural diagram of a server configured to implement a method for pushing recommendation information in an embodiment.

As shown in FIG. 4, in an embodiment, the server 302 includes a processor, a non-volatile storage medium, an internal memory, and a network interface that are connected by using a system bus. The processor has a calculation function and a function of controlling the server 302 to work. The processor is configured to perform a method for pushing recommendation information. The non-volatile storage medium includes at least one of a magnetic storage medium, an optical storage medium, and a flash storage medium. The non-volatile storage medium stores an operating system and an apparatus for pushing recommendation information. The apparatus for pushing recommendation information is configured to implement a method for pushing recommendation information. The network interface is configured to be connected to a network and communicate with the terminal 304.

Figure 5:
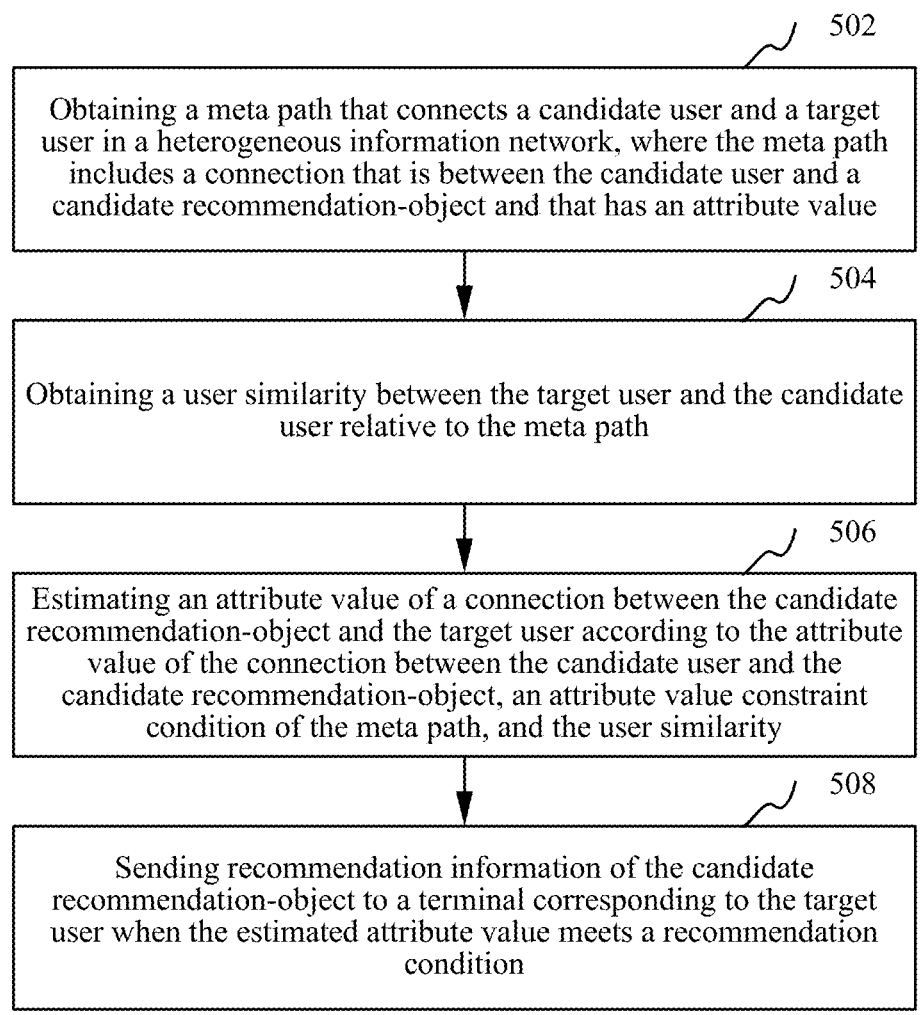
FIG. 5 is a schematic flowchart of a method for pushing recommendation information in an embodiment.

As shown in FIG. 5, in an embodiment, a method for pushing recommendation information is provided. This embodiment is described by using an example in which the method is applied to the server 302 in FIG. 3 and FIG. 4.

Step 502. Obtaining a meta path that connects a candidate user and a target user in a heterogeneous information network, where the meta path includes a connection that is between the candidate user and a candidate recommendation-object and that has an attribute value.

Specifically, the heterogeneous information network includes various types of objects, the objects include at least a candidate user, a target user, and a candidate recommendation-object, and connections between the objects represent relationships between connected objects. Here, the user is a data object obtained through mapping from a natural person, the target user represents a receiver of recommendation information, and the candidate user is a user whose relationship and attribute value are known. The candidate recommendation-object refers to an object that may be recommended to the target user, and includes at least one of movies, music, books, friends, groups, and goods.

The heterogeneous information network includes a meta path, and the meta path is connected to a candidate user and a target user, and includes a candidate recommendation-object. Object types of the meta path are symmetric. For example, in the heterogeneous information network shown in FIG. 2, the meta path may be at least one of "user-group-user", "user-movie-user", "user-movie-movie type-movie-user", "user-user-user", and "user-movie-director-movie-user".

Step 504. Obtaining a user similarity between the target user and the candidate user relative to the meta path.

The similarity refers to similarity measurement, and represents a similarity degree of two objects. The user similarity between the target user and the candidate user relative to the meta path is a similarity that is between the target user and the candidate user and that is calculated based on the meta path. Because an excessively long meta path has no meaning and generates an undesired similarity, the length of the meta path may be limited to a certain number, for example, not larger than 4. The length of the meta path is equal to the number of connections in the meta path.

In an embodiment, Step 504 includes: according to similarities between the target user and the candidate user relative to atomic meta paths of the meta path, obtaining the user similarity between the target user and the candidate user relative to the meta path.

If an attribute value function $\delta_j(Re_j)$ in a meta path $A_1(\delta_1(Re_1))A_2 \ (\delta_2 \ (Re_2)) \ldots (\delta_j(Re_j))A_{i+1}|C$ has a fixed value, the path is referred to as an atomic meta path. One meta path is a set of all atomic meta paths that meet an attribute value constraint condition of the meta path. For an atomic meta path, an existing similarity measurement method may be directly used. The existing similarity measurement method is, for example, PathSim (Y. Sun, J. Han, X. Yan, P. Yu, and T. Wu. Pathsim: Meta path-based top-k similarity search in heterogeneous information networks. In VLDB, pages 992-1003, 2011), PCRW (N. Lao and W. Cohen. Fast query execution for retrieval models based on path constrained random walks. In KDD, pages 881-888, 2010), or HeteSim (C. Shi, X. Kong, Y Huang, P. S. Yu, and B. Wu. Hetesim: A general framework for relevance measure in heterogeneous networks. IEEE Transactions on Knowledge and Data Engineering, 26(10):2479-2492, 2014).

Step 506. Estimating an attribute value of a connection between the candidate recommendation-object and the target user according to the attribute value of the connection between the candidate user and the candidate recommendation-object, an attribute value constraint condition of the meta path, and the user similarity.

Specifically, the meta path further includes an attribute value constraint condition used for restricting a mathematical relationship between two attribute values: the attribute value that is between the candidate user and the candidate recommendation-object, and the attribute value of the connection between the candidate recommendation-object and the target user. The attribute value constraint condition may be that the two attribute values are equal, or within a preset range. When the two attribute values are equal, the attribute value constraint is a strict attribute value constraint, so that a recommendation result is more accurate; while if the two attribute values are within in the preset range, broad meta path semantics can be found.

Using a meta path $U(i)M(j)U|i=j$ as an example, an attribute value i and an attribute value j are variables whose value is 1 to 5, and the attribute value i and the attribute value j need to meet an attribute value constraint condition: i=j. Alternatively, using a meta path $U(i)M(j)U\||i-j|\leq 1$) as an example, an attribute value i and an attribute value j need to meet an attribute value constraint condition: $|i-j|\leq 1$.

In this way, the user similarity may reflect a similarity degree between the candidate user and the target user, and therefore may be used for determining a degree considered in the attribute value corresponding to the corresponding candidate user when the attribute value of the connection between the candidate recommendation-object and the target user is estimated. The attribute value constraint condition may be used for limiting a specific value of an estimated attribute value, so that the estimated attribute value conforms to the semantics of the meta path.

Step 508. Sending recommendation information of the candidate recommendation-object to a terminal corresponding to the target user when the estimated attribute value meets a recommendation condition.

Specifically, the recommendation condition is a determining condition of whether to recommend a corresponding candidate recommendation-object to a target user. The recommendation condition, for example, may be that the estimated attribute value is greater than a preset threshold, or the estimated attribute value is equal to a preset threshold, or the estimated attribute value is less than a preset threshold, and is specifically determined according to the meaning of the attribute value and the recommendation requirement.

For example, if the attribute value represents a rating value given to a movie by a user, if the rating value is positively correlated with an attitude of the user for the movie, that is, that the user likes the movie more indicates a higher rating value, when the estimated attribute value is greater than or equal to a preset threshold, the recommendation information of the candidate recommendation-object is sent to the terminal corresponding to the target user. If the rating value is negatively correlated with the attitude of the user for the movie, that is, that the user likes the movie more indicates a lower rating value, when the estimated attribute value is less than the preset threshold, the recommendation information of the candidate recommendation-object is sent to the terminal corresponding to the target user. The preset threshold may be flexibly configured according to a recommendation precision requirement.

The recommendation information may include description information of the candidate recommendation-object, and may further include an access address of the candidate recommendation-object. For example, when the candidate recommendation-object is a movie, the description information may include information such as a movie name, a movie overview, a director, an actor, and a promotion poster, and the access address may be an access address of a ticket website or an access address of an online video website.

In the foregoing method for pushing recommendation information, a new heterogeneous information network is used for recommending an object, and the heterogeneous information network includes a meta path that connects a candidate user and a target user, and may represent a social-network relationship between the target user and the candidate user. A connection between the candidate user and a candidate recommendation-object in the meta path has an attribute value, so as to quantize a relationship between the candidate user and the candidate recommendation-object. After obtaining a user similarity between the target user and the candidate user relative to the meta path, an attribute value of a connection between the candidate recommendation-object and the target user may be estimated according to the user similarity and in combination with the attribute value of the connection between the candidate user and the candidate recommendation-object and an attribute value constraint condition, and the estimated attribute value may reflect a quantized relationship between the target user and the candidate recommendation-object. In this way, when the heterogeneous information network is used for recommendation, not only a social-network relationship of the target user is considered, but also a quantized relationship between the target user and the candidate recommendation-object is considered, so that a push result is more accurate.

Figure 6:
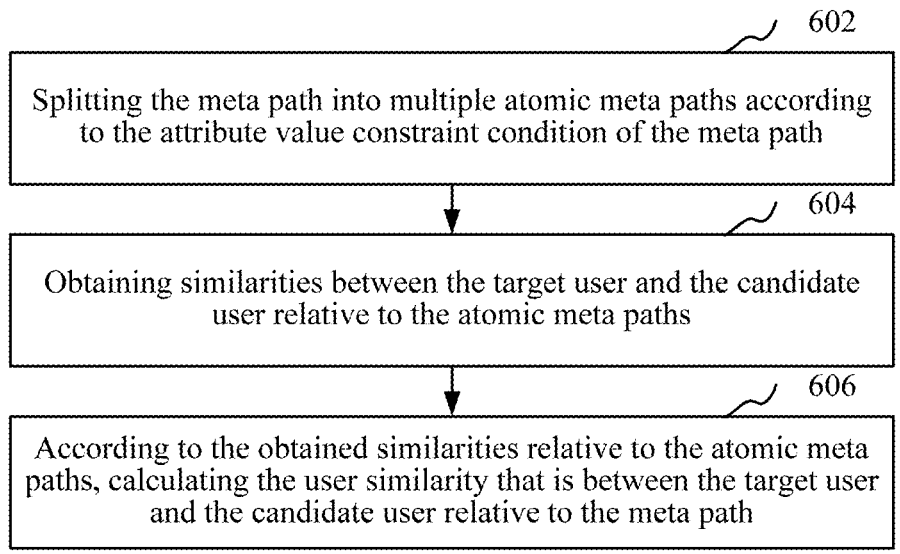
FIG. 6 is a schematic flowchart of steps of obtaining a user similarity that is between a target user and a candidate user and that is relative to a meta path in an embodiment.

As shown in FIG. 6, in an embodiment, Step 504 specifically includes the followings.

Step 602. Splitting the meta path into multiple atomic meta paths according to the attribute value constraint condition of the meta path.

Specifically, for a meta path $A_1(\delta_1(Re_1))A_2(\delta_2(Re_2)) \ldots (\delta_l(Re_l))A_{l+1}|C$, a discrete value range of the attribute value may be traversed when an attribute value constraint condition C is met, to obtain multiple atomic meta paths through splitting. The number of atomic meta paths obtained through splitting is related to the discrete value range and the attribute value constraint condition C.

For example, using the heterogeneous information network shown in FIG. 2 as an example, both U(1)M(1)U and U(1)M(2)U are atomic meta paths. A meta path U(i)M(j)U|i=j may be seen as a set of five atomic meta paths, and may be split into five atomic meta paths, that is, U(1)M(1)U, U(2)M(2)U, U(3)M(3)U, U(4)M(4)U, and U(5)M(5)U.

Step 604. Obtaining similarities between the target user and the candidate user relative to the atomic meta paths.

Specifically, any of these similarity measurement methods: PathSim, PCRW, and HeteSim may be used for calculating similarities between the target user and the candidate user relative to the atomic meta paths. When PathSim is used for calculating the similarity, specifically, the number of instances of the meta paths that connect the target user and the candidate user is calculated first along an atomic meta path, and the number is then regularized, to obtain a corresponding similarity.

Step 606. According to the obtained similarities relative to the atomic meta paths, calculating the user similarity that is between the target user and the candidate user relative to the meta path.

The similarities relative to the atomic meta paths are similarities based on the atomic meta paths. Because the meta path may be split into a group of corresponding atomic meta paths, the user similarity based on the meta path may be seen as a comprehensive similarity based on the similarities of all the corresponding atomic meta paths. The user similarity may be obtained in a summation manner or a weighted summation manner.

In an embodiment, Step 606 includes: calculating a sum of the obtained similarities relative to the atomic meta paths; and using the sum of the similarities directly as the user similarity that is between the target user and the candidate user relative to the meta path, or using the sum of the similarities as the user similarity after performing a positive correlation operation on the sum of the similarities.

Specifically, after the similarities between the target user and the candidate user relative to the atomic meta paths are calculated, similarities corresponding to all atomic meta paths of the meta path are summed. Then, the sum of these similarities may be directly used as the user similarity between the target user and the candidate user relative to the meta path, or a positive correlation operation may be performed on the sum of these similarities and then the resulted sum of these similarities is used as the user similarity between the target user and the candidate user relative to the meta path. The positive correlation operation refers to an operation in which variation trends of a dependent variable and an independent variable are consistent, for example, by adding, subtracting, multiplying, or dividing a positive value. The positive correlation operation includes regularization processing. The regularization processing needs to be performed on user similarities calculated by using the two similarity measurement methods: PathSim and HeteSim, to limit a value range of the calculated similarities.

Figure 7:
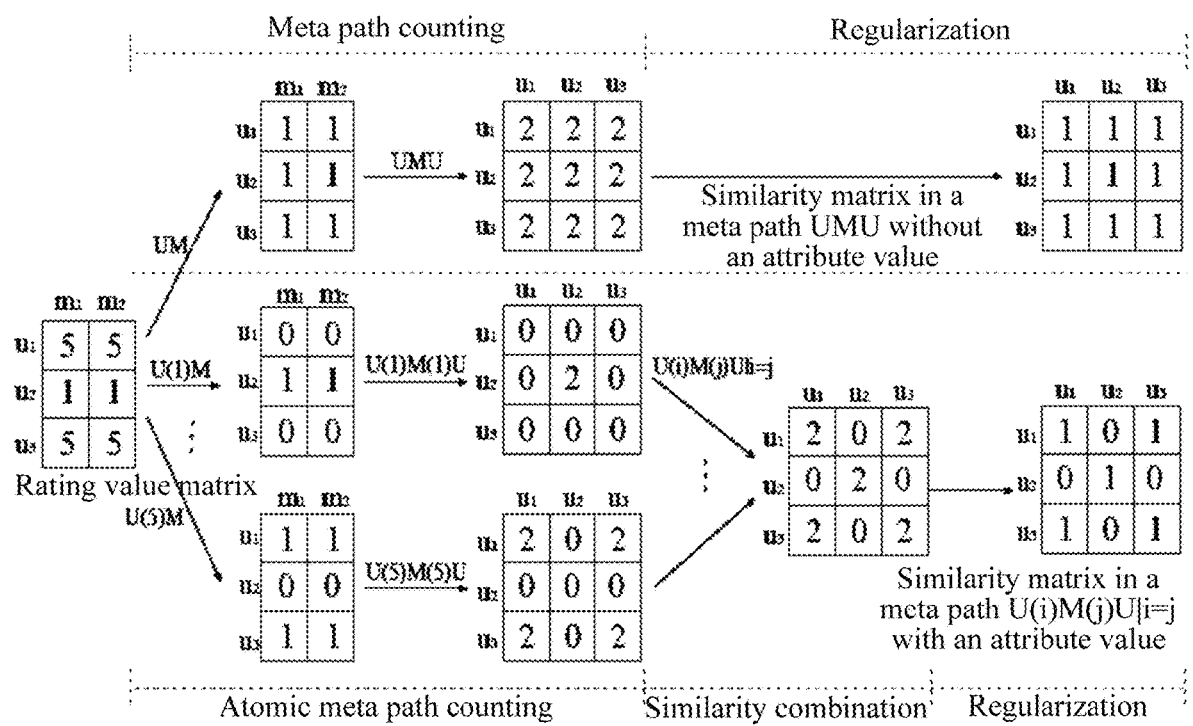
FIG. 7 is a comparison diagram of user similarities calculated in a meta path without an attribute value and in a meta path with an attribute value in an embodiment.

Herein, a heterogeneous information network used for recommending movies is used as an example to describe a process of calculating the user similarity. Referring to FIG. 7, users u1, u2, and u3 all have watched a movie m1 and a movie m2, and have given corresponding rating values, as the rating value matrix shown in FIG. 7. Referring to the upper part of FIG. 7, in a meta path UMU without an attribute value, these rating values are not considered, and only whether corresponding movies are watched is considered. In this way, a similarity matrix calculated by using PathSim represents that similarities between u1, u2, and u3 are equal.

Referring to the lower part of FIG. 7, in comparison, a meta path U(i)M(j)U|i=j with an attribute value is split into five atomic meta paths, and an attribute value of each atomic meta path is fixed. In this way, according to whether u1, u2, and u3 in the atomic meta path separately have rating values for the movie m1 and the movie m2, similarities between u1, u2, and u3 in each atomic meta path may be calculated by directly using PathSim. Then, the similarities between u1, u2, and u3 in different atomic meta paths are separately summated and regularized, so that a similarity matrix in a meta path U(i)M(j)U|i=j may be obtained. As can be seen, only the user u1 and the user u2 are similar because the user u1 and the user u2 have a same watching preference for movies.

Figure 8:
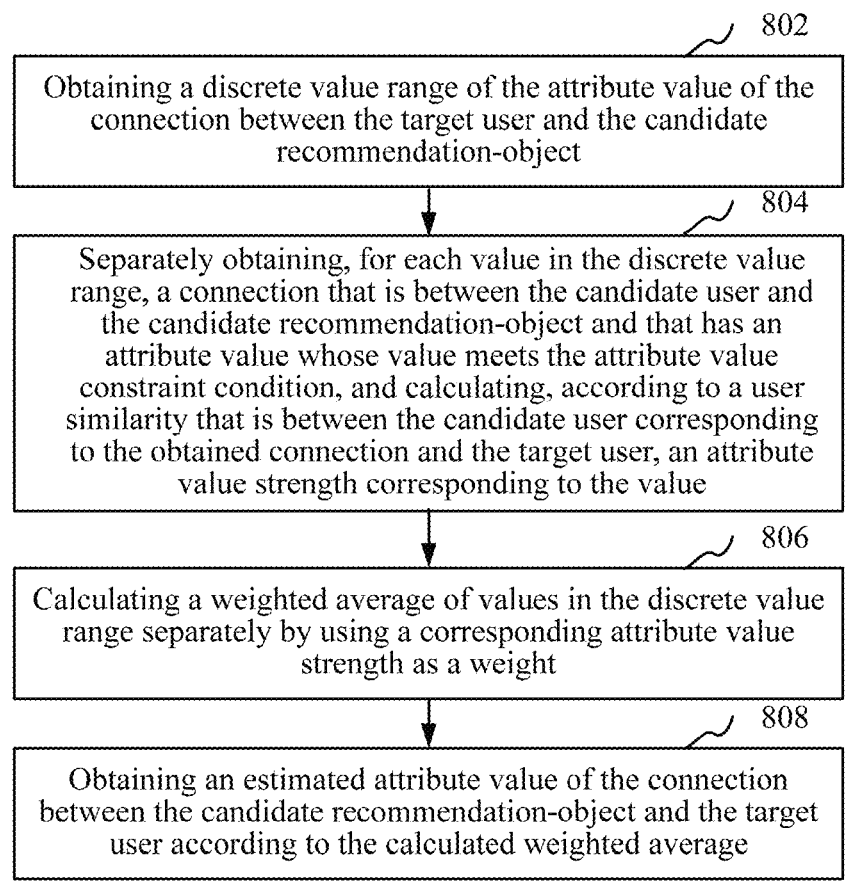
FIG. 8 is a schematic flowchart of estimating an attribute value of a connection between a candidate recommendation-object and a target user according to an attribute value of a connection between the candidate user and the candidate recommendation-object, an attribute value constraint condition of a meta path, and user similarity in an embodiment.

As shown in FIG. 8, in an embodiment, Step 506 specifically includes the followings.

Step 802. Obtaining a discrete value range of the attribute value of the connection between the target user and the candidate recommendation-object.

Specifically, it is assumed that a user set is U, both a candidate user v and a target user u belong to the user set U; a set of candidate recommendation-objects is |X|, a candidate recommendation-object $x \in |X|$; P represents a set of meta paths; $R \in \mathbb{R}^{|U| \times |X|}$ is an attribute value matrix, $R_{u,x} \in \mathbb{R}$ represents attribute values of the target user u and the candidate recommendation-object x; a discrete value range of an attribute value $R_{u,x}$ is a positive integer of 1 to N, for example, N may be 5. R represents a real number set.

Step 804. Separately obtaining, for each value in the discrete value range, a connection that is between the candidate user and the candidate recommendation-object and that has an attribute value whose value meets the attribute value constraint condition, and calculating, according to a user similarity that is between the candidate user corresponding to the obtained connection and the target user, an attribute value strength corresponding to the value.

Specifically, it is assumed that $S \in \mathbb{R}^{|U| \times |X|}$ is a user similarity matrix, representing a similarity between every two users in the user set U. $S_{u,v}^{(l)}$ represents a user similarity that is between the target user u and the candidate user v and that is relative to the meta path $P_l$. Herein, an attribute value strength $Q \in \mathbb{R}^{|U| \times |X| \times N}$ is defined. $Q_{u,x,r}^{(l)}$ represents a strength that an attribute value of a connection between the target user u and the candidate recommendation-object x in a given path $P_l$ is r. The attribute value strength $Q_{u,x,r}^{(l)}$ is related to the user similarity $S_{u,v}^{(l)}$. The attribute value strength $Q_{u,x,r}^{(l)}$ is further related to the number of candidate users v that have attribute values that meet the attribute value constraint condition. When the attribute value constraint condition is that two attribute values are equal, in this case, the attribute value strength $Q_{u,x,r}^{(l)}$ is related to the quantity of the candidate users v whose attribute value is r. $Q_{u,x,r}^{(l)}$ may be calculated by using the following formula (1):

$$Q_{u,x,r}^{(l)} = \sum_v S_{u,v}^{(l)} \times E_{v,x,r} \quad (1)$$

$$E_{v,x,r} = \begin{cases} 1 & R_{v,x} = r \\ 0 & \text{others} \end{cases}$$

In the formula (1), $E_{v,x,r}$ represents whether the attribute value of the connection between the candidate user v and the candidate recommendation-object x is r; if yes, $E_{v,x,r}$ is 1; otherwise, $E_{v,x,r}$ is 0. Herein, when the attribute value constraint condition is that two attribute values are equal is used as an example only. When the attribute value constraint condition is other situations, $E_{v,x,r}$ may be correspondingly modified to that the value is 1 only when $R_{v,x}$ and r meet the attribute value constraint condition.

In this way, corresponding to each value r in the discrete value range, user similarities $S_{u,v}^{(l)}$ that are in the meta path $P1_l$ and that are between a candidate user v and a target user u that are connected to a connection of an attribute value whose value r meets the attribute value constraint condition C\ are separately obtained and summated, to obtain an attribute value strength $Q_{u,x,r}^{(l)}$ corresponding to the value r.

Step 806. Calculating a weighted average of values in the discrete value range separately by using a corresponding attribute value strength as a weight.

Specifically, each value r of 1 to is separately multiplied by a corresponding attribute value strength $Q_{u,x,r}^{(l)}$ to perform weighting to calculate a weighted average. In an embodiment, after regularization processing is performed on the attribute value strength $Q_{u,x,r}^{(l)}$, a weighted average may be further calculated on the values in the discrete value range separately by using a corresponding regularized attribute value strength as a weight. The performing regularization processing on the attribute value strength $Q_{u,x,r}^{(l)}$ is specifically: dividing the attribute value strength $Q_{u,x,r}^{(l)}$ by the sum of all attribute value strengths in the corresponding meta path.

Step 808. Obtaining an estimated attribute value of the connection between the candidate recommendation-object and the target user according to the calculated weighted average.

Specifically, when there is only one meta path, the weighted average calculated in step 806 may be directly used as the estimated attribute value. Specifically, the estimated attribute value may be calculated by using the following formula (2):

$$\hat{R}_{u,x}^{(l)} = \frac{1}{N}\sum_{r=1}^{N} r \times \frac{Q_{u,x,r}^{(l)}}{\sum_{k=1}^{N} Q_{u,x,k}^{(l)}} \quad (2)$$

where $\hat{R}_{u,x}^{(l)}$ represents the estimated attribute value of a connection between a candidate recommendation-object x and a target user u in a meta path $P1_l$, N represents an upper limit of a discrete value range, $Q_{u,x,r}^{(l)}$ represents an attribute value strength corresponding to a value r, and $Q_{u,x,k}^{(l)}$ represents an attribute value strength corresponding to a value k.

In this embodiment, an attribute value of a connection between a target user and a candidate recommendation-object may be predicted according to a given meta path, to recommend the candidate recommendation-object that meets a recommendation condition to the target user. Moreover, the formula (2) has one additional advantage, that is, it may eliminate a bias of user similarities obtained through calculation in different meta paths. Considering that user similarities obtained through calculation based on different meta paths have different value ranges and, therefore, it is difficult to compare similarity calculations between different meta paths and attribute value strengths, regularized or normalized attribute value strengths in the formula (2) may eliminate the difference of the value range.

In an embodiment, Step 808 includes: calculating a weighted average by separately multiplying a weighted average calculated in each meta path by a path weight of a corresponding meta path, to obtain the estimated attribute value of the connection between the candidate recommendation-object and the target user.

Specifically, a unified path weight of each meta path is set for all users, and represents a preference of the users for the meta path. Specifically, as shown in the formula (3):

$$\hat{R}_{u,x} = \sum_{l=1}^{|P|} w^{(l)} \times \hat{R}_{u,x}^{(l)} \quad (3)$$

where $w^{(l)}$ represents a path weight of a meta path $P_l$. A comprehensive estimated attribute value $\hat{R}_{u,x}$ based on all meta paths may be represented by using a weighted average of attribute values $\hat{R}_{u,x}$ estimated on the meta paths. The sum of path weights of meta paths obtained after target optimization is performed is 1. Therefore, $\hat{R}_{u,x}$ is a weighted average calculated by separately multiplying a weighted average calculated in each meta path by a path weight of the corresponding meta path.

To make the estimated attribute value matrix $\hat{R} \in R^{|U| \times |X|}$ close to the real attribute value matrix R, herein, a bisection error based on the real attribute value and the estimated attribute value defines a target function, as shown in the formula (4):

$$\min_w L_1(w) = \frac{1}{2}\left\|Y \square \left(R - \sum_{l=1}^{|P|} w^{(l)} \hat{R}^{(l)}\right)\right\|_2^2 + \frac{\lambda_0}{2}\|w\|_2^2 \quad (4)$$

s.t. $w \geq 0$,

The symbol □ represents a Hadamard product of matrices, that is, a product of corresponding elements; $\|\cdot\|_p$ represents a p norm of matrices. Y represents an indicating matrix, $Y_{u,x}=1$ represents that a connection between the target user u and the candidate recommendation-object x has an attribute value; otherwise, $Y_{u,x}=0$; $\lambda_0$ is a control parameter. s.t. represents a constraint condition. When a real attribute value of the connection between the target user and the candidate recommendation-object is known, the target function of the foregoing formula (4) may be optimized to calculate a path weight vector $w \in R^{1 \times |P|}$.

In an embodiment, Step 808 includes: calculating a weighted average by separately multiplying a weighted average calculated in each meta path by path weights corresponding to the target user and the corresponding meta path, to obtain the estimated attribute value of the connection between the candidate recommendation-object and the target user.

Specifically, considering that in many real application scenarios, each user has a personalized interest preference, and a unified path weight cannot provide a personalized recommendation to the user. To implement the personalized recommendation, a path weight vector may be set for each user. It is assumed that a path weight matrix is represented as $W \in R^{|U| \times |P|}$, where each element $W_u^{(l)}$ represents path weights corresponding to the target user u and the path $P_l$. A column vector $W^{(l)} \in R^{|U| \times 1}$ represents path weight vectors of all users in a path $P_l$. Therefore, the estimated attribute value matrix $\hat{R}_{u,x}$ represents an attribute value of a connection between the target user u in all meta paths and the candidate recommendation-object v. There is the formula (5):

$$\hat{R}_{u,x} = \sum_{l=1}^{|P|} W_u^{(l)} \times \hat{R}_{u,x}^{(l)} \quad (5)$$

Another target function is also defined, such as the formula (6):

$$\min_W L_2(W) = \frac{1}{2} \left\| Y \square \left( R - \sum_{l=1}^{|P|} \text{diag}(W^{(l)}) \hat{R}^{(l)} \right) \right\|_2^2 + \frac{\lambda_0}{2} \|W\|_2^2 \quad (6)$$

s.t. $W \geq 0$,

The symbol $\square$ represents a Hadamard product of matrices, that is, a product of corresponding elements; $\|\cdot\|_p$ represents a p norm of matrices. Y represents an indicating matrix, $Y_{u,x}=1$ represents that a connection between the target user u and the candidate recommendation-object x has an attribute value; otherwise, $Y_{u,x}=0$. $\lambda_0$ is a control parameter. $\text{diag}(W^{(l)})$ represents a diagonal matrix converted from a vector $W^{(l)}$. s.t. represents a constraint condition. When a real attribute value of the connection between the target user u and the candidate recommendation-object x is known, the target function of the foregoing formula (6) may be optimized to calculate a path weight vector W.

In an embodiment, the method for pushing recommendation information further includes: obtaining a real attribute value of the connection between the candidate recommendation-object and the target user; initializing the path weights corresponding to the target user and the meta path; and adjusting, according to the user similarity, the initialized path weights in a direction towards an average of the path weights corresponding to the candidate user and the meta path, so that a difference between the real attribute value and the estimated attribute value meets a minimization condition.

Specifically, although the user personalized path weight is considered in the formula (6), it is difficult for users who have only a small amount of attribute value information to perform effective weight learning. Weights that need to be learned are totally $|U| \times |P|$, but the number of training samples is far less than $|U| \times |X|$. The training samples are always insufficient to perform weight learning, and this is particularly important for cold start users and goods. A path weight of a user should be relatively consistent with a path weight of a similar user. For users who have only a small quantity of attribute values, their path weights may be learned from path weights of other users similar to the users, because a user similarity based on a meta path is more effective for these users.

The path weights corresponding to the target user and the meta path are initialized, and may be specifically initialized to 0 or a value greater than 0, and the initialized path weight is then adjusted in a direction towards an average of path weights corresponding to the candidate user and the meta path. An approaching speed is positively correlated with a user similarity, a larger user similarity indicates a faster approaching speed, and a smaller user similarity indicates a slower approaching speed. When the difference between the real attribute value and the estimated attribute value meets the minimization condition, the adjusting is stopped. The minimization condition may be the foregoing formula (4) or (6) or the following formula (9).

Therefore, a path weight regularizer is defined, as shown in the formula (7):

$$\sum_{u=1}^{|U|} \sum_{l=1}^{|P|} \left( W_u^{(l)} - \sum_{v=1}^{|U|} \bar{S}_{u,v}^{(l)} W_v^{(l)} \right)^2 \quad (7)$$

where $|U|$ represents a total quantity of users, $|P|$ represents a total quantity of extended paths, $W_u^{(l)}$ represents path weights corresponding to a target user u and a path $P_l$, $W_v^{(l)}$ represents path weights corresponding to a candidate user v and a path $P_l$, and $$\bar{S}_{u,v}^{(l)} = \frac{S_{u,v}^{(l)}}{\sum_v S_{u,v}^{(l)}}$$

is a user similarity, on which regularization is performed, that is based on a path $P_l$ and that is between the target user u and the candidate user v. For convenience, the path weight regularizer may be represented in a matrix form of the following formula (8):

$$\sum_{l=1}^{|P|} \left\| W^{(l)} - \bar{S}^{(l)} W^{(l)} \right\|_2^2 \quad (8)$$

where $W^{(l)}$ is a path weight matrix, $\bar{S}^{(l)}$ is a user similarity matrix based on a path $P_l$ and on which regularization is performed, $\|\cdot\|_2$ represents a 2 norm of matrices.

Based on the foregoing formula (6), a path weight regularizer is added, to obtain a target function such as the following formula (9):

$$\min_W L_3(W) = \frac{1}{2} \left\| Y \square \left( R - \sum_{l=1}^{|P|} \text{diag}(W^{(l)}) \hat{R}^{(l)} \right) \right\|_2^2 + \frac{\lambda_1}{2} \sum_{l=1}^{|P|} \left\| W^{(l)} - \bar{S}^{(l)} W^{(l)} \right\|_2^2 + \|W\|_2^2 + \frac{\lambda_0}{2} \|W\|_2^2 \quad (9)$$

s.t. $W \geq 0$.

wherein the symbol $\square$ represents a Hadamard product of matrices, that is, a product of corresponding elements; $\|\cdot\|_p$ represents a p norm of matrices; Y represents an indicating matrix, $Y_{u,x}=1$ represents that a connection between the target user u and the candidate recommendation-object x has an attribute value; otherwise, $Y_{u,x}=0$. $\lambda_0$ is a control parameter; $\lambda_1$ is another control parameter; $W^{(l)}$ represents path weight vectors of all users in a path $P_l$; $\text{diag}(W^{(l)})$ represents a diagonal matrix converted from a vector $W^{(l)}$; W represents path weight matrices of all users; $\hat{R}^{(l)}$ represents an estimated attribute value matrix based on a meta path $P_l$, and R represents a real attribute value matrix.

The foregoing formula (9) is a non-negative quadratic programming problem, that is, a simple form of non-negative matrix decomposition. An optimized solution may be performed by using a gradient projection method for resolving an optimization problem with a non-negative boundary constraint. For the gradient projection method for resolving an optimization problem with a non-negative boundary constraint, reference may be made to "C. J. Lin. Projected gradient methods for non-negative matrix factorization. In Neural Computation, pages 2756-2279, 2007". The gradient for $W_u^{(l)}$ in the formula (9) is:

$$\frac{\partial L_3(W)}{\partial W_u^{(l)}} = -\left(Y_u \Box \left(R_u - \sum_{l=1}^{|P|} W_u^{(l)} \hat{R}_u^{(l)}\right)\right)^T \hat{R}_u^{(l)} + \quad (10)$$

$$\lambda_0 W_u^{(l)} + \lambda_1 \left(W_u^{(l)} - \bar{S}_u^{(l)} W^{(l)}\right) - \lambda_1 \bar{S}_u^{(l)T} \left(W^{(l)} - \bar{S}^{(l)} W^{(l)}\right)$$

where the symbol T represents a transposition. An updated formula of $W_u^{(l)}$ is shown in the formula (11):

$$W_u^{(l)} = \max\left(0, W_u^{(l)} - \alpha \frac{\partial L_3(W)}{\partial W_u^{(l)}}\right) \quad (11)$$

where $\alpha$ is a step, and may be set according to a user requirement.

Specifically, the path weights corresponding to the target user and the meta path may be learned by using the following step (1) to step (7). Step (1) to step (7) may be referred to as a SemRec method (Semantic path based personalized Recommendation method).

Step (1). Obtaining a heterogeneous information network G with an attribute value, a meta path set P of connected users, a control parameter $\lambda_0$, a control parameter $\lambda_1$, a step $\alpha$ when a parameter is updated, and a convergence threshold $\delta$.

Step (2). Separately calculating, relative to each meta path in the meta path set P, a user similarity matrix $S^{(l)}$, an attribute value strength matrix $Q^{(l)}$, and an estimated attribute value matrix $\hat{R}^{(l)}$.

Step (3). Initializing a path weight matrix W>0.

Repeatedly performing the following steps (4), (5), and (6), until $|-W_{old}|<\delta$ is met.

Step (4). $W_{old}:=W$.

Step (5). Calculating $$\frac{\partial L_3(W)}{\partial W_u^{(l)}}.$$

Step (6).

$$W := \max\left(0, W - \alpha \frac{\partial L_3(W)}{\partial W}\right).$$

Step (7). Outputting a path weight matrix W of all users.

where $W_{old}:=W$ represents assigning W to $W_{old}$, $$\frac{\partial L_3(W)}{\partial W}$$

represents calculating a partial differential of the formula (9), $$W := \max\left(0, W - \alpha \frac{\partial L_3(W)}{\partial W}\right)$$

represents choosing a maximum value between 0 and $$W - \alpha \frac{\partial L_3(W)}{\partial W},$$

and $|W-W_{old}|<\delta$ represents that a difference between W calculated in neighboring two iterations is less than a convergence threshold $\delta$.

As can be found from the target function, the unified path weight learning method (as $L_1$ shown in the formula (4)) is a special personalized weight learning method ($L_2$ shown in the formula (6)), that is, path weights (that is, $W^{(l)}$) of all users in the path $P_l$ are equal. In addition, both the two weight learning methods are special examples of a weight learning method of a path weight regularizer. The optimized target function $L_3$ changes to $L_2$ when $\lambda_1$ is 0, and changes to $L_1$ when $\lambda_1$ is approaching $+\infty$. Therefore, the control parameter $\lambda_1$ actually controls the personalization level, and a smaller $\lambda_1$ represents a more strong user personalized path weight, but this makes weight learning very difficult. Therefore, a real application may need to set a suitable $\lambda_1$ according to an application scenario.

In an embodiment, the candidate recommendation-object is a network resource; and the attribute value is a rating value. The network resource includes resources that can be obtained from a network, such as movies, videos, and novels, and the rating value may be used for reflecting a quantized attitude of a user to the network resources.

To verify a recommendation effect of a heterogeneous information network with an attribute value, two data sets are obtained from the network. A first data set includes 13367 user object users, 12677 movies, and 1068278 rating values of 1 to 5. The first data set further includes a social-network relationship between the user object users and attribute information of the user object users and the movies. A second data set includes rating values of the user object users to local merchants, and attribute information of the user object users and the merchants. The data set includes 16239 user object users, 14284 local merchants, and 198397 rating values of 1 to 5. Table 1 is detailed statistical information of the two data sets. The two data sets have some different properties. The rating value relationships of the first data set are denser but the social-network relationships are very sparse, and the rating value relationships of the second data set are relatively sparse but the social-network relationships are denser.

TABLE 1

|  | Relationship (A-B) | Quantity of A | Quantity of B | Quantity of A-B |
|---|---|---|---|---|
| First data set | user-movie | 13367 | 12677 | 1068278 |
|  | user-user | 2440 | 2294 | 4085 |
|  | user-group | 13337 | 2753 | 570047 |
|  | movie-director | 10179 | 2449 | 11276 |
|  | movie-actor | 11718 | 6311 | 33587 |
|  | movie-type | 12676 | 38 | 27668 |
| Second data set | user-industry (B) | 16239 | 14284 | 198397 |
|  | user-user | 10580 | 10580 | 158590 |
|  | user-evaluation (Co) | 14411 | 11 | 76875 |
|  | industry-city (Ci) | 14267 | 47 | 14267 |
|  | industry-category (Ca) | 14180 | 511 | 40009 |

Here, two general evaluation indicators: a root mean squared error (RMSE) and a mean absolute error (MAE), are used to evaluate and estimate the quality of the attribute value.

$$RMSE = \sqrt{\frac{\sum_{(u,x) \in R_{test}} (R_{u,x} - \hat{R}_{u,x})^2}{|R_{test}|}} \quad (12)$$

$$MAE = \frac{\sum_{(u,x) \in R_{test}} |R_{u,x} - \hat{R}_{u,x}|}{|R_{test}|} \quad (13)$$

where $R_{test}$ represents an entire test set. Further, a data set is divided into a training set and a test set, the training set is used for training a heterogeneous information network with an attribute value, and the test set is used for testing an effect of the trained heterogeneous information network. A smaller MAE or RMSE indicates a better effect.

To show the effectiveness of the provided SemRec method, four variant methods of SemRec are compared. In addition to the personalized path weight learning method (referred to as SemRecReg) with a path weight regularizer, three special versions of SemRec are further considered: A method based on a single meta path (referred to as Sem-RecSgl), a method of learning a unified path weight by all users (referred to as SemRecAll), and a method for learning a personalized path weight by each user (referred to as SemRecInd).

Because an excessively long meta path has no meaning and generates a bad similarity, herein, five meta paths whose length is not over 4 are used in each data set. Table 2 shows these meta paths with a weight or without a weight. A user similarity is calculated in SemRec by using PathSim. The parameter $\lambda_0$ in SemRec is set to 0.01, and $\lambda_1$ is set to 103.

TABLE 2

| First data set | Second data set |
|---|---|
| UGU | UU |
| U(i)M(j)U\|i = j | UCoU |
| U(i)MDM(j)U\|i = j | U(i)B(j)U\|i = j |
| U(i)MAM(j)U\|i = j | U(i)BCaB(j)U\|i = j |
| U(i)MTM(j)U\|i = j | U(i)BCiB(j)U\|i = j |

For the first data set, different training data proportions (20%, 40%, 60%, and 80%) are set to show comparison results in different data sparsity. That the training data proportion is 20% represents that 20% of rating values in a user-candidate recommendation-object rating value matrix is used as a training set to perform model training, and the remaining 80% of rating values is predicted. The first data set has denser rating value relationships. The rating value relationships of the second data set are sparser. Therefore, more data in the second data set is used as training sets (60%, 70%, 80%, and 90%). For each experiment result, ten training sets and test sets are obtained through division independently and randomly according to a given proportion, and an average is used as the result shown in Table 3.

TABLE 3

| Data set | Proportion of training set | SemRec$_{Sgl}$ | | SemRec$_{All}$ | | SemRec$_{Ind}$ | | SemRec$_{Reg}$ | |
|---|---|---|---|---|---|---|---|---|---|
|  |  | RMSE | MAE | RMSE | MAE | RMSE | MAE | RMSE | MAE |
| First data set | 20% | 0.8434 | 0.6506 | 0.8125 | 0.6309 | 0.8753 | 0.6412 | 0.7844 | 0.6054 |
|  |  | 13.50% | 9.61% | 16.67% | 12.35% | 10.23% | 10.92% | 19.55% | 15.89% |
|  | 40% | 0.8138 | 0.6351 | 0.7814 | 0.6149 | 0.8083 | 0.6032 | 0.7452 | 0.5808 |
|  |  | 3.75% | −0.51% | 7.58% | 2.69% | 4.40% | 4.54% | 11.86% | 8.09% |
|  | 60% | 0.7937 | 0.6172 | 0.7709 | 0.6098 | 0.7729 | 0.5840 | 0.7296 | 0.5698 |
|  |  | 0.48% | −2.70% | 3.34% | −1.46% | 3.08% | 2.83% | 8.51% | 5.19% |
|  | 80% | 0.7846 | 0.6142 | 0.7656 | 0.6072 | 0.7540 | 0.5739 | 0.7216 | 0.5639 |
|  |  | −2.25% | −5.68% | 0.22% | −4.47% | 1.73% | 1.26% | 5.96% | 2.98% |
|  | Time consumption | 0 | | 1.44 | | 155.98 | | 293.14 | |
| Second data set | 60% | 1.3252 | 0.9657 | 1.2166 | 0.9040 | 1.3654 | 1.0029 | 1.2025 | 0.8901 |
|  |  | 21.02% | 25.70% | 27.49% | 30.45% | 18.62% | 22.84% | 28.33% | 31.51% |
|  | 70% | 1.2889 | 0.9420 | 1.1906 | 0.8873 | 1.3229 | 0.9728 | 1.1760 | 0.8696 |
|  |  | 19.09% | 23.18% | 25.27% | 27.64% | 19.96% | 20.67% | 26.18% | 29.08% |
|  | 80% | 1.2576 | 0.9224 | 1.1665 | 0.8723 | 1.2922 | 0.9517 | 1.1559 | 0.8548 |
|  |  | 17.93% | 21.43% | 23.87% | 25.70% | 15.67% | 18.94% | 24.56% | 27.19% |
|  | 90% | 1.2331 | 0.9067 | 1.1496 | 0.8616 | 1.2658 | 0.9322 | 1.1423 | 0.8442 |
|  |  | 16.87% | 19.93% | 22.50% | 23.91% | 14.66% | 17.68% | 22.99% | 25.45% |
|  | Time consumption | 0 | | 0.25 | | 57.22 | | 374.57 | |

Through analysis on a test result of Table 3, different versions of SemRec have different performance. Generally, SemRec (such as SemRecAll and SemRecReg) with multiple paths has a better effect than SemRec (that is, Sem-RecSgl) with a single path, with the exception of SemRe-cInd. This represents that a path weight learning method of SemRec may effectively integrate similarity information generated on different paths. Because of the sparsity of rating values, a recommendation effect of SemRecInd is worse than an effect of SemRecAll in most cases. In addition, SemRecReg may achieve a better effect in all cases. This is because SemRecReg not only implements personalized path weight learning of all users, but also uses path weight regularization to avoid a problem brought by the sparsity of rating values.

In addition, an average running time of these methods in the learning process is recorded. SemRec of four versions has a longer running time as the complexity of the path weight learning method increases. SemRecSgl and SemRecAll are very fast, and may be directly applied to online learning. The running time of SemRecInd and SemRecReg are also acceptable. In actual application, a suitable SemRec method may be selected according to a requirement to balance the efficiency and performance.

Figure 9:
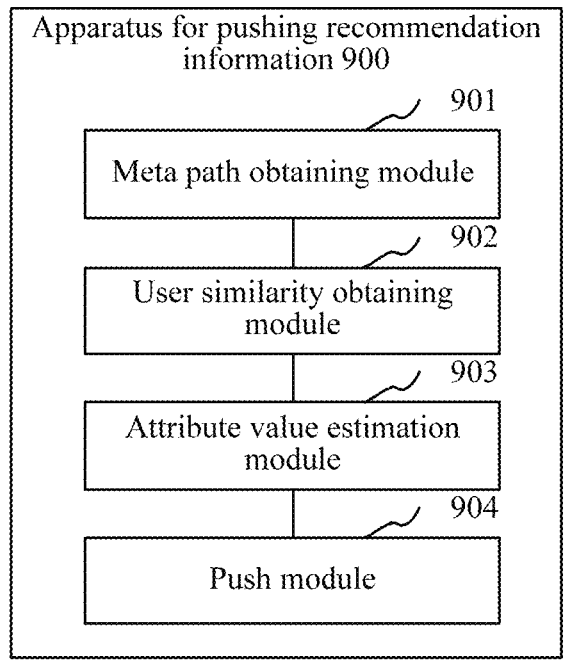
FIG. 9 is a structural block diagram of an apparatus for pushing recommendation information in an embodiment.

As shown in FIG. 9, in an embodiment, an apparatus 900 for pushing recommendation information is provided and has functional modules for implementing the method for pushing recommendation information of the foregoing embodiments. The apparatus 900 for pushing recommendation information includes: a meta path obtaining module 901, a user similarity obtaining module 902, an attribute value estimation module 903, and a push module 904.

The meta path obtaining module 901 is configured to obtain a meta path that connects a candidate user and a target user in a heterogeneous information network, where the meta path includes a connection that is between the candidate user and a candidate recommendation-object and that has an attribute value.

The user similarity obtaining module 902 is configured to obtain a user similarity between the target user and the candidate user relative to the meta path.

The attribute value estimation module 903 is configured to estimate an attribute value of a connection between the candidate recommendation-object and the target user according to the attribute value of the connection between the candidate user and the candidate recommendation-object, an attribute value constraint condition of the meta path, and the user similarity.

The push module 904 is configured to send recommendation information of the candidate recommendation-object to a terminal corresponding to the target user when the estimated attribute value meets a recommendation condition.

Figure 10:
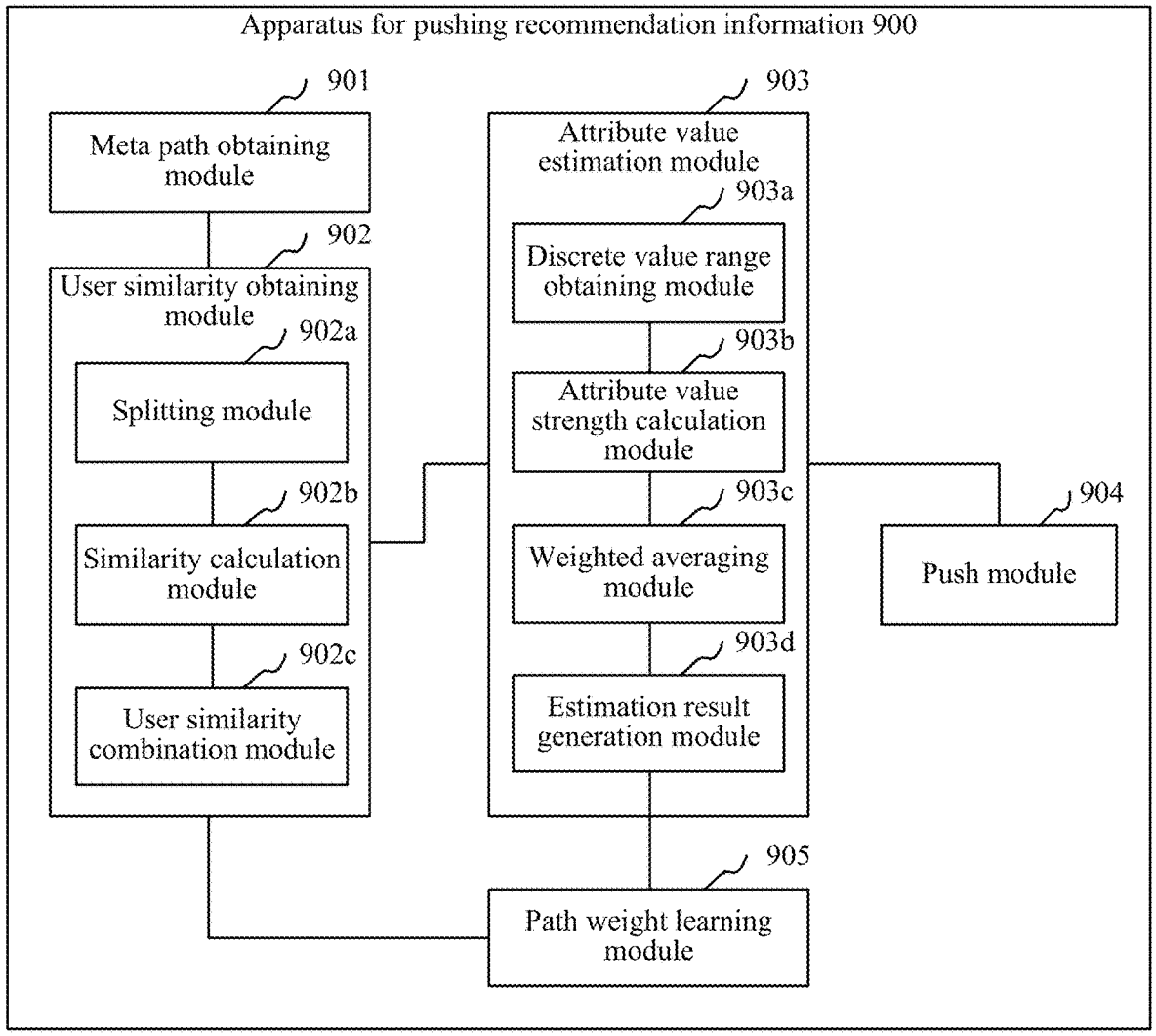
FIG. 10 is a structural block diagram of an apparatus for pushing recommendation information in another embodiment.

As shown in FIG. 10, in an embodiment, the user similarity obtaining module 902 includes: a splitting module 902a, a similarity calculation module 902b, and a user similarity combination module 902c.

The splitting module 902a is configured to split the meta path into multiple atomic meta paths according to the attribute value constraint condition of the meta path.

The similarity calculation module 902b is configured to obtain similarities between the target user and the candidate user relative to the atomic meta paths.

The user similarity combination module 902c is configured to calculate, according to the obtained similarities relative to the atomic meta paths, the user similarity between the target user and the candidate user relative to the meta path.

In an embodiment, the user similarity combination module 902c is further configured to calculate a sum of the obtained similarities relative to the atomic meta paths; and use the sum of the similarities directly as the user similarity between the target user and the candidate user relative to the meta path, or use the sum of the similarities as the user similarity after performing a positive correlation operation on the sum of the similarities.

In an embodiment, the attribute value estimation module 903 includes: a discrete value range obtaining module 903a, an attribute value strength calculation module 903b, a weighted averaging module 903c, and an estimation result generation module 903d.

The discrete value range obtaining module 903a is configured to obtain a discrete value range of the attribute value of the connection between the target user and the candidate recommendation-object.

The attribute value strength calculation module 903b is configured to separately obtain, for each value in the discrete value range, a connection that is between the candidate user and the candidate recommendation-object and that has an attribute value whose value meets the attribute value constraint condition, and calculate, according to a user similarity that is between the candidate user corresponding to the obtained connection and the target user, an attribute value strength corresponding to the value.

The weighted averaging module 903c is configured to calculate a weighted average of values in the discrete value range separately by using a corresponding attribute value strength as a weight.

The estimation result generation module 903d is configured to obtain an estimated attribute value of the connection between the candidate recommendation-object and the target user according to the calculated weighted average.

In an embodiment, the estimation result generation module 903d is further configured to calculate a weighted average by separately multiplying a weighted average calculated in each meta path by a path weight of a corresponding meta path, to obtain the estimated attribute value of the connection between the candidate recommendation-object and the target user.

In an embodiment, the estimation result generation module 903d is further configured to calculate a weighted average by separately multiplying a weighted average calculated in each meta path by path weights corresponding to the target user and the corresponding meta path, to obtain the estimated attribute value of the connection between the candidate recommendation-object and the target user.

In an embodiment, the apparatus 900 for pushing recommendation information further includes: a path weight learning module 905, configured to obtain a real attribute value of the connection between the candidate recommendation-object and the target user; initialize the path weights corresponding to the target user and the meta path; and adjust, according to the user similarity, the initialized path weights in a direction towards an average of the path weights corresponding to the candidate user and the meta path, so that a difference between the real attribute value and the estimated attribute value meets a minimization condition.

In an embodiment, the candidate recommendation-object is a network resource; and the attribute value is a rating value.

A person of ordinary skill in the art may understand that all or some processes for implementing the foregoing embodiment methods may be completed by a computer program instructing related hardware. The program may be stored in a computer readable storage medium. When the program is running, the processes in the embodiments of the foregoing methods may be included. The storage medium may be a non-volatile storage medium such as a magnetic disk, an optical disc, a read-only memory (ROM), or a random access memory (RAM).

The foregoing technical characteristics of the embodiments may be combined randomly. For ease of description, not all possible combinations of the technical characteristics in the foregoing embodiments are described. However, as long as these combinations of the technical characteristics do not conflict, the combinations shall be considered as the scope recorded in this specification.

The foregoing embodiments only describe several implementations of the present disclosure, and the descriptions are relatively specific and detailed, but cannot be understood as limitation to the patent scope of the present invention. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for pushing recommendation information, comprising:
    obtaining a meta path that connects a candidate user and a target user in a heterogeneous information network, the meta path comprising a connection between the candidate user and a candidate recommendation-object and having a candidate attribute value;
    obtaining a user similarity between the target user and the candidate user relative to the meta path, including:
        identifying a training meta path that connects the candidate user, the target user, and a set of training objects;
        splitting the training meta path into a plurality of training atomic meta paths, wherein, in a first of the plurality of atomic training meta paths, rating responses to a first of the set of training objects from the target and candidate users are tabulated into a first table, and in a second of the plurality of atomic meta paths, rating responses to a second of the set of training objects from the target and candidate users are tabulated into a second table;
        normalizing the rating responses in the first and second tables into a value of 0, 1, or 2; and
        obtaining the user similarity between the candidate and target users based on the first and second tables after normalizing the rating responses;
    estimating a target attribute value of a connection between the candidate recommendation-object and the target user according to the candidate attribute value of the connection between the candidate user and the candidate recommendation-object, an attribute value constraint condition of the meta path, and the user similarity, wherein the attribute value constraint condition restricts a mathematical difference between the candidate attribute value and the target attribute value to be within a preset range; and
    sending recommendation information of the candidate recommendation-object to a terminal corresponding to the target user when the estimated attribute value meets a recommendation condition.

2. The method according to claim 1, wherein the estimating the target attribute value of the connection between the candidate recommendation-object and the target user comprises:
    obtaining a discrete value range of the target attribute value of the connection between the target user and the candidate recommendation-object;
    separately obtaining, for each value in the discrete value range, a connection that is between the candidate user and the candidate recommendation-object and that has an attribute value whose value meets the attribute value constraint condition;
    calculating, according to a user similarity that is between the candidate user corresponding to the obtained connection and the target user, an attribute value strength corresponding to the value;
    calculating a weighted average of values in the discrete value range separately by using a corresponding attribute value strength as a weight; and
    obtaining the estimated attribute value of the connection between the candidate recommendation-object and the target user according to the calculated weighted average.

3. The method according to claim 2, wherein the obtaining the estimated attribute value of the connection between the candidate recommendation-object and the target user according to the calculated weighted average comprises:
    calculating a composite weighted average by separately multiplying a weighted average calculated in each meta path by a path weight of the each meta path, to obtain the estimated attribute value of the connection between the candidate recommendation-object and the target user.

4. The method according to claim 2, wherein the obtaining the estimated attribute value of the connection between the candidate recommendation-object and the target user according to the calculated weighted average comprises:
    calculating a composite weighted average by separately multiplying a weighted average calculated in each meta path by a path weight of the each meta path relative to path weights corresponding to the target user and the meta path, to obtain the estimated attribute value of the connection between the candidate recommendation-object and the target user.

5. The method according to claim 4, further comprising:
    obtaining a real attribute value of the connection between the candidate recommendation-object and the target user;
    initializing the path weights corresponding to the target user and the meta path to obtain the initialized path weights; and
    adjusting, according to the user similarity, the initialized path weights in a direction towards an average of path weights corresponding to the candidate user and the meta path, so that a difference between the real attribute value and the estimated attribute value meets a minimization condition.

6. The method according to claim 1, wherein the candidate recommendation-object is a network resource including at least one of a movie, a music recording, a book, and a piece of goods; and the attribute value is a rating value.

7. A server, comprising: a memory storing instructions; and a processor coupled to the memory and, when executing the instructions, configured for:
    obtaining a meta path that connects a candidate user and a target user in a heterogeneous information network, the meta path comprising a connection between the candidate user and a candidate recommendation-object and having a candidate attribute value;
    obtaining a user similarity between the target user and the candidate user relative to the meta path, including:
        identifying a training meta path that connects the candidate user, the target user, and a set of training objects;
        splitting the training meta path into a plurality of training atomic meta paths, wherein, in a first of the plurality of atomic training meta paths, rating responses to a first of the set of training objects from the target and candidate users are tabulated into a first table, and in a second of the plurality of atomic meta paths, rating responses to a second of the set of training objects from the target and candidate users are tabulated into a second table;

normalizing the rating responses in the first and second tables into a value of 0, 1, or 2; and obtaining the user similarity between the candidate and target users based on the first and second tables after normalizing the rating responses;

estimating a target attribute value of a connection between the candidate recommendation-object and the target user according to the candidate attribute value of the connection between the candidate user and the candidate recommendation-object, an attribute value constraint condition of the meta path, and the user similarity, wherein the attribute value constraint condition restricts a mathematical difference between the candidate attribute value and the target attribute value to be within a preset range; and sending recommendation information of the candidate recommendation-object to a terminal corresponding to the target user when the estimated attribute value meets a recommendation condition.

8. The server according to claim 7, wherein the estimating the target attribute value of the connection between the candidate recommendation-object and the target user comprises:

obtaining a discrete value range of the target attribute value of the connection between the target user and the candidate recommendation-object;

separately obtaining, for each value in the discrete value range, a connection that is between the candidate user and the candidate recommendation-object and that has an attribute value whose value meets the attribute value constraint condition;

calculating, according to a user similarity that is between the candidate user corresponding to the obtained connection and the target user, an attribute value strength corresponding to the value;

calculating a weighted average of values in the discrete value range separately by using a corresponding attribute value strength as a weight; and obtaining the estimated attribute value of the connection between the candidate recommendation-object and the target user according to the calculated weighted average.

9. The server according to claim 8, wherein the obtaining the estimated attribute value of the connection between the candidate recommendation-object and the target user according to the calculated weighted average comprises:

calculating a composite weighted average by separately multiplying a weighted average calculated in each meta path by a path weight of the each meta path, to obtain the estimated attribute value of the connection between the candidate recommendation-object and the target user.

10. The server according to claim 8, wherein the obtaining the estimated attribute value of the connection between the candidate recommendation-object and the target user according to the calculated weighted average comprises:

calculating a composite weighted average by separately multiplying a weighted average calculated in each meta path by a path weight of the each meta path relative to path weights corresponding to the target user and the meta path, to obtain the estimated attribute value of the connection between the candidate recommendation-object and the target user.

11. The server according to claim 10, wherein the processor is further configured for:

obtaining a real attribute value of the connection between the candidate recommendation-object and the target user;

initializing the path weights corresponding to the target user and the meta path to obtain the initialized path weights; and adjusting, according to the user similarity, the initialized path weights in a direction towards an average of path weights corresponding to the candidate user and the meta path, so that a difference between the real attribute value and the estimated attribute value meets a minimization condition.

12. The server according to claim 7, wherein the candidate recommendation-object is a network resource including at least one of a movie, a music recording, a book, and a piece of goods; and the attribute value is a rating value.

13. A non-transitory computer-readable storage medium containing computer-executable instructions for, when executed by one or more processors, performing a recommendation information pushing method, the method comprising:

obtaining a meta path that connects a candidate user and a target user in a heterogeneous information network, the meta path comprising a connection between the candidate user and a candidate recommendation-object and having a candidate attribute value;

obtaining a user similarity between the target user and the candidate user relative to the meta path, including:

identifying a training meta path that connects the candidate user, the target user, and a set of training objects;

splitting the training meta path into a plurality of training atomic meta paths, wherein, in a first of the plurality of atomic training meta paths, rating responses to a first of the set of training objects from the target and candidate users are tabulated into a first table, and in a second of the plurality of atomic meta paths, rating responses to a second of the set of training objects from the target and candidate users are tabulated into a second table;

normalizing the rating responses in the first and second tables into a value of 0, 1, or 2; and obtaining the user similarity between the candidate and target users based on the first and second tables after normalizing the rating responses;

estimating a target attribute value of a connection between the candidate recommendation-object and the target user according to the attribute value of the connection between the candidate user and the candidate recommendation-object, an attribute value constraint condition of the meta path, and the user similarity, wherein the attribute value constraint condition restricts a mathematical difference between the candidate attribute value and the target attribute value to be within a preset range; and sending recommendation information of the candidate recommendation-object to a terminal corresponding to the target user when the estimated attribute value meets a recommendation condition.

14. The non-transitory computer-readable storage medium according to claim 13, wherein the estimating the target attribute value of the connection between the candidate recommendation-object and the target user comprises:
obtaining a discrete value range of the target attribute value of the connection between the target user and the candidate recommendation-object;
separately obtaining, for each value in the discrete value range, a connection that is between the candidate user and the candidate recommendation-object and that has an attribute value whose value meets the attribute value constraint condition;
calculating, according to a user similarity that is between the candidate user corresponding to the obtained connection and the target user, an attribute value strength corresponding to the value;
calculating a weighted average of values in the discrete value range separately by using a corresponding attribute value strength as a weight; and
obtaining the estimated attribute value of the connection between the candidate recommendation-object and the target user according to the calculated weighted average.

15. The method according to claim 1, wherein obtaining the user similarity further comprises calculating a sum of at least a portion of the rating responses to obtain the user similarity.

16. The server according to claim 7, wherein obtaining the user similarity further comprises calculating a sum of at least a portion of the rating responses to obtain the user similarity.

17. The non-transitory computer-readable storage medium according to claim 13, wherein obtaining the user similarity further comprises calculating a sum of at least a portion of the rating responses to obtain the user similarity.

* * * * *